United States Patent [19]

McCormick

[11] Patent Number: 4,754,837

[45] Date of Patent: Jul. 5, 1988

[54] LIFT TRUCK STEERING APPARATUS

[75] Inventor: Edward J. McCormick, Greene, N.Y.

[73] Assignee: The Raymond Corporation, Greene, N.Y.

[21] Appl. No.: 44,356

[22] Filed: Apr. 30, 1987

[51] Int. Cl.$^4$ .............................................. B60K 17/30
[52] U.S. Cl. ................................. 180/253; 280/95 R
[58] Field of Search ................. 180/253, 252; 280/93, 280/95 R, 96

[56] References Cited

U.S. PATENT DOCUMENTS

| | | | |
|---|---|---|---|
| 3,239,025 | 3/1966 | Schreck | 280/93 X |
| 3,364,781 | 1/1968 | Ulinski | 280/93 X |
| 3,392,797 | 7/1968 | Gibson et al. | 180/253 |
| 3,722,613 | 3/1973 | De Priester et al. | 180/253 X |
| 4,463,821 | 8/1984 | Falamak | 180/252 X |
| 4,616,730 | 10/1986 | Strehler et al. | 180/253 |

FOREIGN PATENT DOCUMENTS 626469   8/1961  Canada ................................. 180/53
1920711 11/1969  Fed. Rep. of Germany ........ 280/93

Primary Examiner—John A. Pekar
Attorney, Agent, or Firm—Richard G. Stephens

[57] ABSTRACT

In a lift truck having one steerable powered drive wheel assembly and a steerable idler wheel assembly interconnected by a pair of links and a crank, steering is accomplished by means which apply torque directly to the drive wheel assembly. The steering rotation of the drive wheel assembly rotates the idler wheel assembly, so that forces transmitted through the links and the crank to steer the idler wheel assembly are independent of drive wheel loading, and less motive force is required to steer the truck at large cramp angles.

9 Claims, 3 Drawing Sheets

LIFT TRUCK STEERING APPARATUS

This invention relates to material handling apparatus, and more particularly, to improved apparatus for steering vehicles in which a powered steerable drive wheel is paired with an unpowered steerable wheel. One well known type of lift truck employs a pair of unpowered non-steerable front wheels, or "load" wheels, affixed to the main frame of the truck, a steerable powered drive wheel assembly rigidly mounted on the truck base frame near one rear corner of the truck, and an unpowered vertically-sprung wheel mounted near the other rear corner of the truck. With the drive wheel mounted rigidly in a vertical sense relative to the main frame of the truck, an idler wheel mounted on the same base frame must be vertically sprung, or otherwise floor irregularities could result in loss of traction of the drive wheel, essentially because three points define a plane. While some trucks of the type thus far described use a centered or self-steering idler wheel, controlled steering of the idler wheel is often desired, for better lateral stability, and the invention is concerned with controlled steering of both the drive wheel and the idler wheel. One form of such a prior truck is shown in U.S. Pat. No. 3,392,797.

Another known form of truck employs a pair of unpowered non-steerable front wheels fixed to the main frame of the truck, with a steerable powered drive wheel and a steerable idler wheel rigidly mounted on a rear sub-frame. The rear sub-frame may rotate limited amounts about a longitudinal horizontal axis to insure traction despite floor irregularities, so that neither of the rear wheels need be vertically sprung, though they may be if so desired. The present invention is also applicable to this type of truck.

Prior trucks utilizing a steered unpowered rear wheel usually have used a pivotally-mounted hydraulic ram to steer the truck, as shown in U.S. Pat. No. 3,392,797, for example. The ram rotated a bell crank or rocker member, with the ends of the bell crank connected to the powered drive wheel and to the idler wheel through respective links. The force exerted by the ram had to be sufficient to overcome both drive wheel loading and idler wheel loading, and the moment arms through which the links acted disadvantageously varied with steering angle. In such prior trucks the hydraulic ram is required to provide very large forces, especially when changing the steering angle near a fully cramped steering condition. That requirement has disadvantageously required a larger ram and more hydraulic capacity than is desirable. The torques required to steer the drive wheel and the idler wheel depend principally upon the respective vertical loadings on those wheels. In typical applications the loading on the drive wheel is about twice that on the idler wheel. In accordance with one important aspect of the present invention, a truck having one powered rear wheel and one unpowered rear wheel is steered by means (e.g. a rotary motor and a chain or gear) which directly rotates the unpowered rear wheel unit, which is linked through a pair of links and a bell crank to the nonpowered rear wheel. Stated in a different way, torque is applied to rotate the drive wheel assembly, and the drive wheel assembly rotates the steering linkage, rather than both being rotated by the steering linkage as in the prior art system. With such an arrangement, the torque which the steering motor must apply to the steerable drive wheel unit does not depend upon the instantaneous steering angle. Further, the maximum amount of torque which must be transmitted through the links and bell crank is only the amount of torque needed to steer the idler wheel. The link connected to the drive wheel, and the half of the bell crank to which that link is connected, now need transmit only the torque required to steer the idler wheel, and hence those members may be made lighter. With such an arrangement a steering motor having a modest torque capability and size can provide the force needed for steering as the steering angle approaches or moves away from a fully cramped condition. Provision of a steering arrangement having such an advantage is an important object of the invention.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 3A:
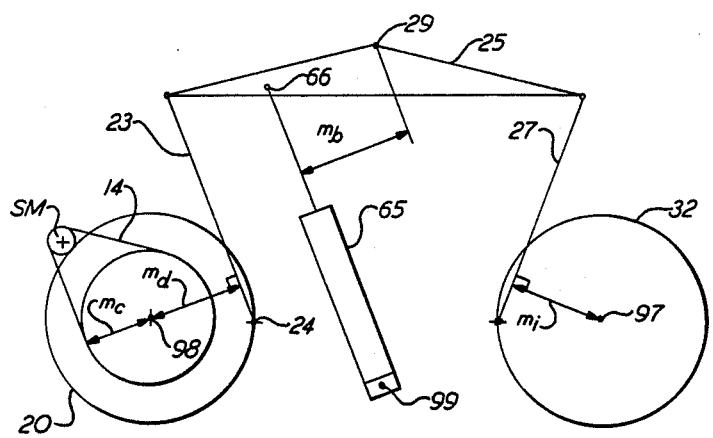
Figure 3B:
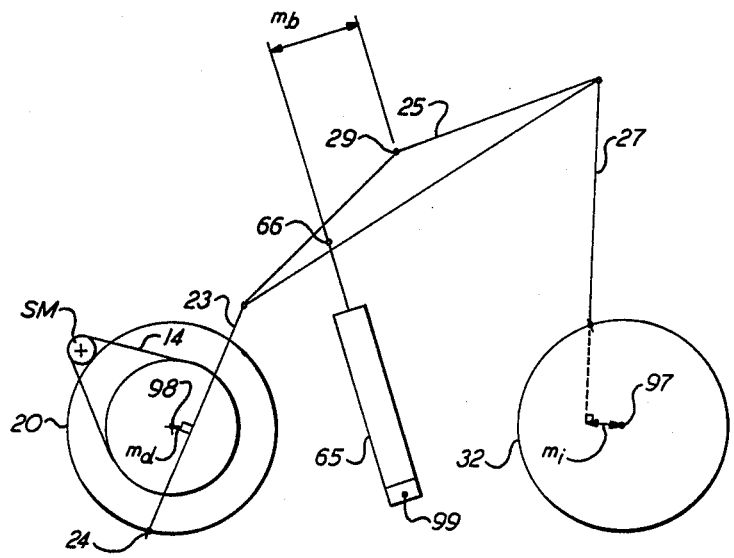
Figure 3C:
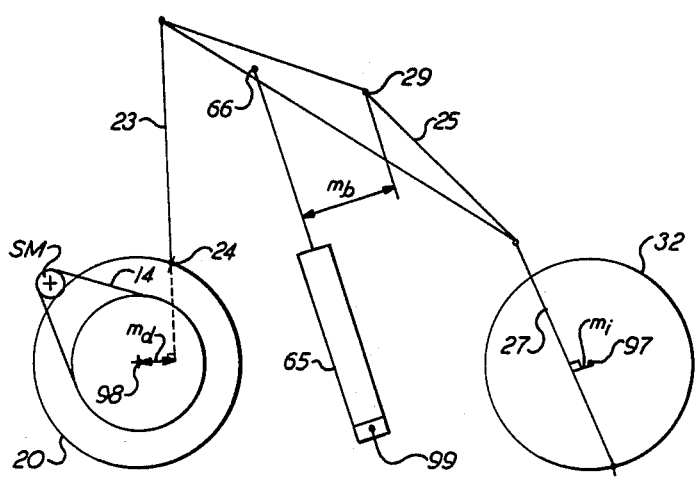

FIGS. 3a, 3b and 3c are geometrical plan view diagrams illustrating variations in various moment arm distances as a steering linkage is varied between a straight-ahead steering condition and two mutually-opposite fully-cramped steering conditions, and useful in understanding advantages of the present invention over a prior art ram-actuated steering system utilizing a generally similar steering linkage.

Figure 4:
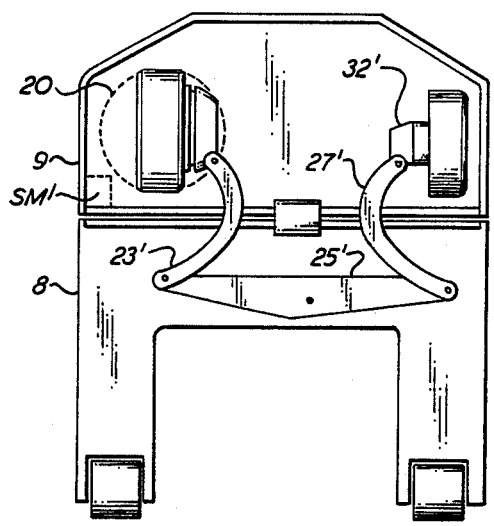

FIG. 4 is a bottom view of a truck illustrating a modified form of the invention.

Figure 5A:
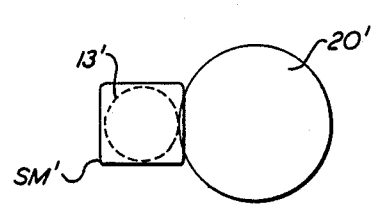
Figure 5B:
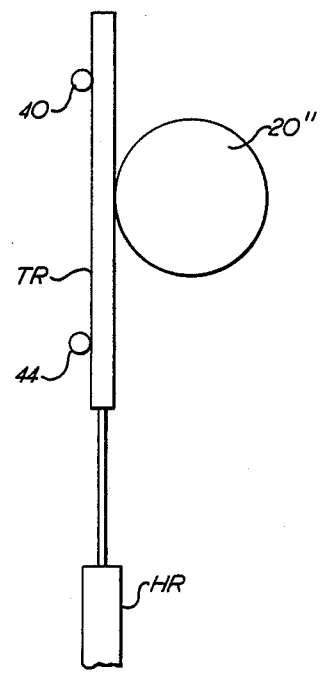

FIGS. 5a and 5b are diagrammatic views illustrating both possible modifications which may be made to the invention.

Figure 1:
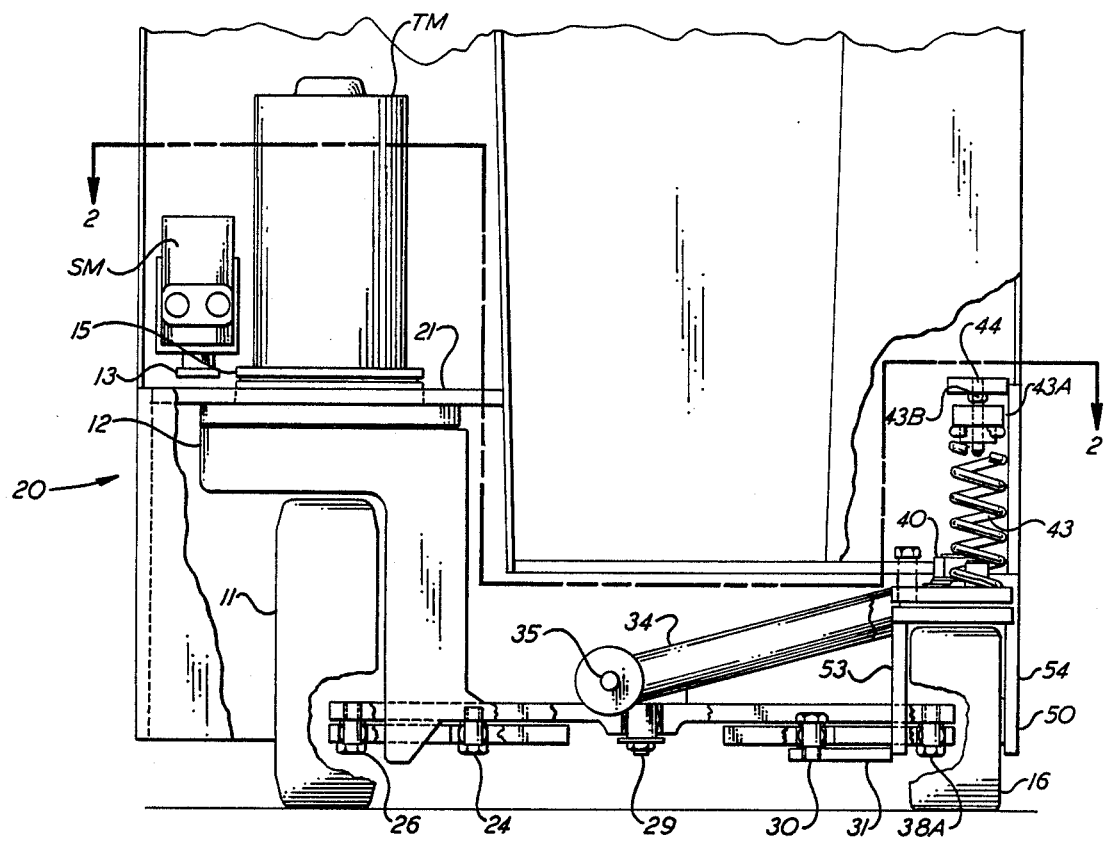
FIG. 1 is a rear elevation view of one form of lift truck incorporating a preferred form of the invention, with certain parts cut away and certain parts omitted for sake of clarity.
Figure 2:
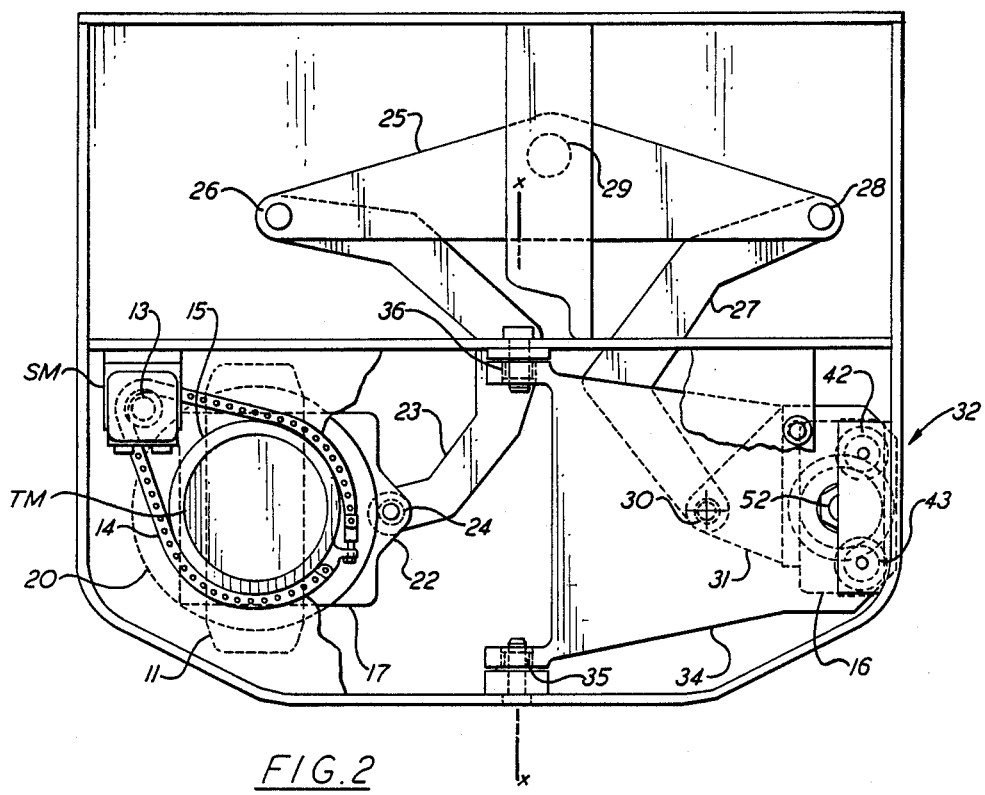
FIG. 2 is a downward section view taken at lines 2—2 in FIG. 1.

FIGS. 1 and 2 illustrate the rear end of a lift truck which has a conventional base frame from which two arms (not shown) extend forwardly in conventional fashion with conventional load wheels carried at the foward ends of the arms.

Referring to FIGS. 1 and 2, the left side of the rear of the truck is shown supported by a steerable powered drive wheel assembly 20 which is rotatably mounted on plate 21 (FIG. 1) rigidly affixed relative to the base frame of the truck. The drive wheel assembly includes an electric traction motor TM which drives drive wheel 11 through reduction gearing 12. Rotary motive means shown as comprising a rotary hydraulic steering motor SM is fixedly mounted relative to the base frame of the truck and is operated by a conventional operator control (not shown) in which an operator-controlled steering wheel positions a follower valve, causing rotation of steering motor SM in the direction of, and in an amount proportional to, steering wheel rotation. The shaft of motor SM carries a sprocket 13 which is connected via chain 14 (FIG. 2) to a sprocket member 15 formed on drive unit 20. Chain 14 is omitted from FIG. 1 for sake of clarity. Use of a sprocket on the motor shaft smaller than the sprocket formed on the drive unit provides a mechanical advantage, so that a small motor SM is quite adequate to rotate drive unit 20 to steer the truck. Thus it will be seen that steering motor SM, sprockets 13 and 15 and chain 14 collectively comprise means for directly rotating drive wheel assembly 20. Other types of means for rotating the drive wheel assembly directly, rather than through a steering linkage, may be used, as will be discussed below.

Drive wheel assembly 20 may comprise a powered steerable unit of the nature shown in U.S. Pat. No. 3,392,797, with a sprocket or gear added to such a unit to allow it to be rotated. Alternatively, drive wheel assembly 20 may comprise an assembly of the nature shown in U.S. Pat. No. 3,163,250, for example, with a pad or bracket 22 (FIG. 2) affixed to it to accommodate pivotal attachment of one end of link 23 to the drive wheel assembly via spherical bearing 24. The other end of link 23 is pivotally attached to one end of bell crank or rocker member 25 via spherical bearing 26. A center portion of bell crank 25 is pivotally attached to the base frame of the truck via needle roller bearing 29. As powered drive wheel assembly 20 is rotated counterclockwise (as viewed in FIG. 2) from the position shown, it will be appreciated that link 23 will rotate bell crank 25 clockwise about bearing 29. One end of a link 27 is pivotally attached to bell crank 25 by spherical bearing 28, and the other end of link 27 is pivotally attached by spherical bearing 30 to an arm 31 affixed to a non-castered roller wheel assembly 32. As bell crank 25 rotates clockwise, idler wheel assembly 32 is rotated counterclockwise. The geometry of links 23 and 27, their respective distances from the steering axes of drive wheel assembly 20 and idler wheel assembly 32, and the length of bell crank 25 are chosen so that as the drive wheel assembly and the idler wheel assembly are steered, the axes of the axles of their respective wheels always nearly intersect at a common point on a line which extends through the axle axes of the load wheels (not shown) at the front of the truck. The use of such steering geometry is by no means new.

The idler wheel assembly 32 is shown journalled by means of a roller thrust bearing 40 (FIG. 1) near the outer end of a rigid A-frame arm, or lever member 34, which is shown pivotally mounted to the base frame of the truck, near the lateral center of the truck, by trunion bearings 35,36, so that A-frame lever member 34 may rotate limited amounts about a horizontal longitudinally-extending axis x—x (FIG. 2). A pair of compression springs 42,43 are shown interposed between the outer end of A-frame lever member 34 and a plate affixed to the base frame of the truck. Idler wheel assembly 32 includes an idler wheel 16 and a vertical steering shaft 52. The axis of steering shaft 52 intersects the axis of the axle of wheel 16, i.e. the idler wheel is not castered. The particular manner of mounting the non-castered idler wheel assembly is not a feature of the present invention, but described in greater detail and claimed in my co-pending application Ser. No. 61,479 filed June 15, 1987. Various other known techniques for mounting a non-castered idler wheel assembly may be used without departing from the present invention, including, for example, the idler wheel mounting arrangement shown in U.S. Pat. No. 3,392,797. Further, the idler wheel assembly need not necessarily be vertically sprung; instead the drive unit assembly and the idler wheel assembly can be rigidly mounted in a sub-frame allowed to rotate relative to the frame carrying the load wheels, as is discussed below in connection with FIG. 4.

While steering motor SM is shown connected to rotate drive assembly 20 via sprockets and a chain 14 in FIG. 2, it should become apparent at this point that similar operation may be achieved by connecting that motor to that drive assembly via one or more gears. FIG. 5a diagrammatically illustrates an arrangement in which gear 13' on the shaft of motor SM' engages gear teeth formed around the periphery of drive assembly 20' to rotate drive assembly 20'. FIG. 5b diagrammatically illustrates an arrangement in which a double-acting hydraulic ram HR translates a toothed rack TR which engages gear teeth formed around drive wheel assembly 20" to rotate that assembly. Rollers 44,44 maintain the rack in engagement with the gear teeth on the drive wheel assembly. It is important to note that the steering means utilized to directly rotate the drive assembly 20 may take a variety of forms. In small trucks having modest wheel loading, sprocket 13 can be carried on a shaft turned by the operator steering wheel. On heavier trucks having greater wheel loading, a conventional "torque-booster" or power-assist assembly may rotate sprocket 13 (or gear 13' of FIG. 5a) and be controlled by the truck steering wheel. The steering motor SM may comprise an electric motor (with a speed reducer gearbox) controlled by steering wheel rotation in various ways well known in the art.

Understanding of various features of the invention may be facilitated by reference now to the geometrical diagrams of FIGS. 3a to 3c, wherein comparisons are made to the prior art ram-actuated steering system. In FIGS. 3a to 3c certain reference numerals are made to correspond to parts shown in FIGS. 1 and 2 for ease of understanding. In each of these Figures, a bell crank or rocker member 25 pivotally mounted at 29 is shown connected via a drag link 23 to the powered drive wheel assembly 20 and via a drag link 27 to an idler wheel assembly 32. Links 23 and 27 are shown as simple straight links for ease of understanding. A hydraulic ram 65 is shown pivotally connected to the base frame at 99 and pivotally connected to the bell crank at 66, as in prior art systems. Such a ram is not used, of course, in the system of the present invention; instead steering means are directly connected to rotate the drive wheel assembly, such steering means being shown in FIGS. 3a–3c as rotary motor SM connected to rotate the drive wheel assembly via chain 14.

FIG. 3a illustrates a zero steering angle, or straight-ahead steering condition. It will be understood that as the ram is retracted or extended, it rotates bell crank 25 about pivot point 29, causing the links 23 and 27 to rotate the drive wheel and idler wheel assemblies about vertical steering axes shown as points 98 and 97. Circles indicate the arcs through which ends of links 23 and 27 swing as steering occurs.

With a given wheel loading on either steered wheel assembly, the amount of force which a link must apply in order to turn the assembly depends inversely upon the moment arm distance through which the force applied by the link acts. In FIGS. 3a–3c a moment arm distance associated with the drive wheel assembly is indicated by dimension $m_d$, and a moment arm distance associated with the idler wheel assembly is indicated by dimension $m_i$. In FIG. 3a representing straight ahead steering, both moment arm distances $m_d$ and $m_i$ are relatively large. Assume ram 65 is retracted, to rotate bell crank 25 clockwise, thereby to rotate the wheel assemblies counterclockwise. FIG. 3b illustrates the conditions which pertain when the wheel assemblies have been cramped fully counterclockwise. Importantly, moment arm distances $m_d$ and $m_i$ become much smaller than in FIG. 3a, meaning that ram 65 and links 23 and 27 must apply much larger forces to rotate the wheel assemblies. Now assume instead, from the straight ahead steering angle depicted in FIG. 3a, that ram 65 is extended, to rotate bell crank 20 counterclockwise and to rotate the wheel assemblies clockwise. FIG. 3c illustrates the conditions which pertain when the wheel assemblies have been cramped fully clockwise. Again, moment arm distances $m_d$ and $m_i$ become significantly smaller than in FIG. 3a, meaning that larger forces are required to rotate the wheel assemblies to steer the vehicle.

The force required from the ram depends not only upon the moment arm distances $m_d$ and $m_i$ through which links 23 and 27 act, but also upon the moment arm distance $m_b$ at which the ram applies force to the bell crank. It may be seen that distance $m_b$ is smaller in FIG. 3b than in FIG. 3a, further resulting in greater force being required from the ram.

Now having considered the above-related disadvantages of the prior ram-actuated steering system, assume that ram 65 is omitted, and steering is accomplished by motor SM, shown connected to rotate the drive wheel assembly via chain 14 and suitable sprockets. With such a chain-sprocket connection, the torque of motor SM is applied to the drive wheel assembly with a fixed mechanical advantage, irrespective of instantaneous steering angle. The moment arm distance at which chain 14 acts on the drive wheel assembly is shown by dimension $m_c$ (FIG. 3a). It is important to note that in the two fully cramped steering situations depicted in FIGS. 3b and 3c, that distance $m_d$ has become smaller than distance $m_c$. While the shortening of moment arm $m_d$ constituted a distinct disadvantage in the prior art ram-actuated system where force was being transmitted from the bell crank to the drive wheel assembly, that shortening of moment arm $m_d$ provides a mechanical advantage in the present invention, where force is transmitted in the opposite direction, from the drive wheel assembly to the bell crank.

With motor SM connected to directly rotate the drive wheel assembly, it will be apparent that drive wheel loading does not affect the forces applied from the drive wheel assembly via links 23,27 and bell crank 25 to steer the idler wheel assembly. The shortening of moment arm $m_i$ during the two fully-cramped steering conditions depicted in FIGS. 3b and 3c does require that increased forces be applied through the links to steer the idler wheel assembly at and near fully-cramped steering angles, as in the case of the prior art ram-actuated system. However, the forces transmitted through the links and bell crank only need overcome idler wheel loading, and, as previously mentioned, idler wheel loading is about half that of drive wheel loading in typical operations.

While the truck illustrated in FIGS. 1 and 2 utilizes a vertically-sprung idler wheel, the invention is also applicable to trucks in which the idler wheel is not vertically sprung. In FIG. 4 drive wheel assembly 20' and idler wheel assembly 32' are both mounted rigidly, in a vertical sense, in a rear sub-frame 9, which is capable of limited rotation about a horizontal longitudinally-extending axis relative to the main frame 8 of the truck. Drive wheel assembly 20' is rotated by steering motor SM', and connected via link 23', bell crank 25' and link 27' to rotate idler wheel assembly 32'. The links are connected by means of spherical bearings to accommodate the slight relative rotation between main frame 8 and sub-frame 9. Rocker member 25' is shown pivotally mounted on frame 8 in FIG. 4, but in trucks wherein the sub-frame has a greater longitudinal dimension member 25' can instead be pivotally mounted on the sub-frame.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a lift truck having a base frame supported at its front end by a pair of non-steerable load wheels, a drive wheel assembly including a powered steerable drive wheel mounted adjacent one rear corner of the truck, an idler wheel assembly including a steerable idler wheel mounted adjacent the other rear corner of the truck, a pivotally mounted rocker member, a first link connected between said rocker member and said drive wheel assembly, and a second link connected between said rocker member and said idler wheel assembly, the improvement which comprises steering means for applying torque to said drive wheel assembly to rotate said drive wheel assembly, whereby rotation of said drive wheel assembly applies forces via said links and said rocker member to rotate said idler wheel assembly and the forces transmitted via said links and said rocker member are independent of drive wheel loading, said rocker member and said links being located to swing through space located below the upper extremity of said steerable idler wheel.

2. The truck according to claim 1 wherein said drive wheel assembly and said idler wheel assembly are mounted on said base frame of said truck and said idler wheel assembly is vertically sprung relative to said base frame.

3. The truck according to claim 1 having a second frame pivotally connected to said base frame to allow limited rotation of said second frame relative to said base frame, said drive wheel assembly and said idler wheel assembly being mounted on said second frame.

4. The truck of claim 1 wherein said steering means comprises a rotary motor, and chain-sprocket means interconnecting said rotary motor and said drive wheel assembly.

5. The truck of claim 4 wherein said rotary motor comprises a hydraulic motor.

6. The truck of claim 1 wherein said steering means comprises a rotary motor, and gear means interconnecting said rotary motor and said drive wheel assembly.

7. The truck of claim 1 wherein said steering means comprises a hydraulic ram, and gear means interconnecting said ram and said drive wheel assembly.

8. The truck of claim 1 wherein the moment arm through which said steering means acts to rotate said drive wheel assembly exceeds the moment arm between said drive wheel assembly and said first link when said wheel assemblies are turned to a fully cramped steering condition in either direction.

9. The truck of claim 1 wherein said drive wheel and said idler wheel are mounted to be turned about respective steering axes, and wherein said rocker member is mounted to pivot about a point substantially laterally midway between said steering axes.

* * * * *